United States Patent Office 2,878,927
Patented Mar. 24, 1959

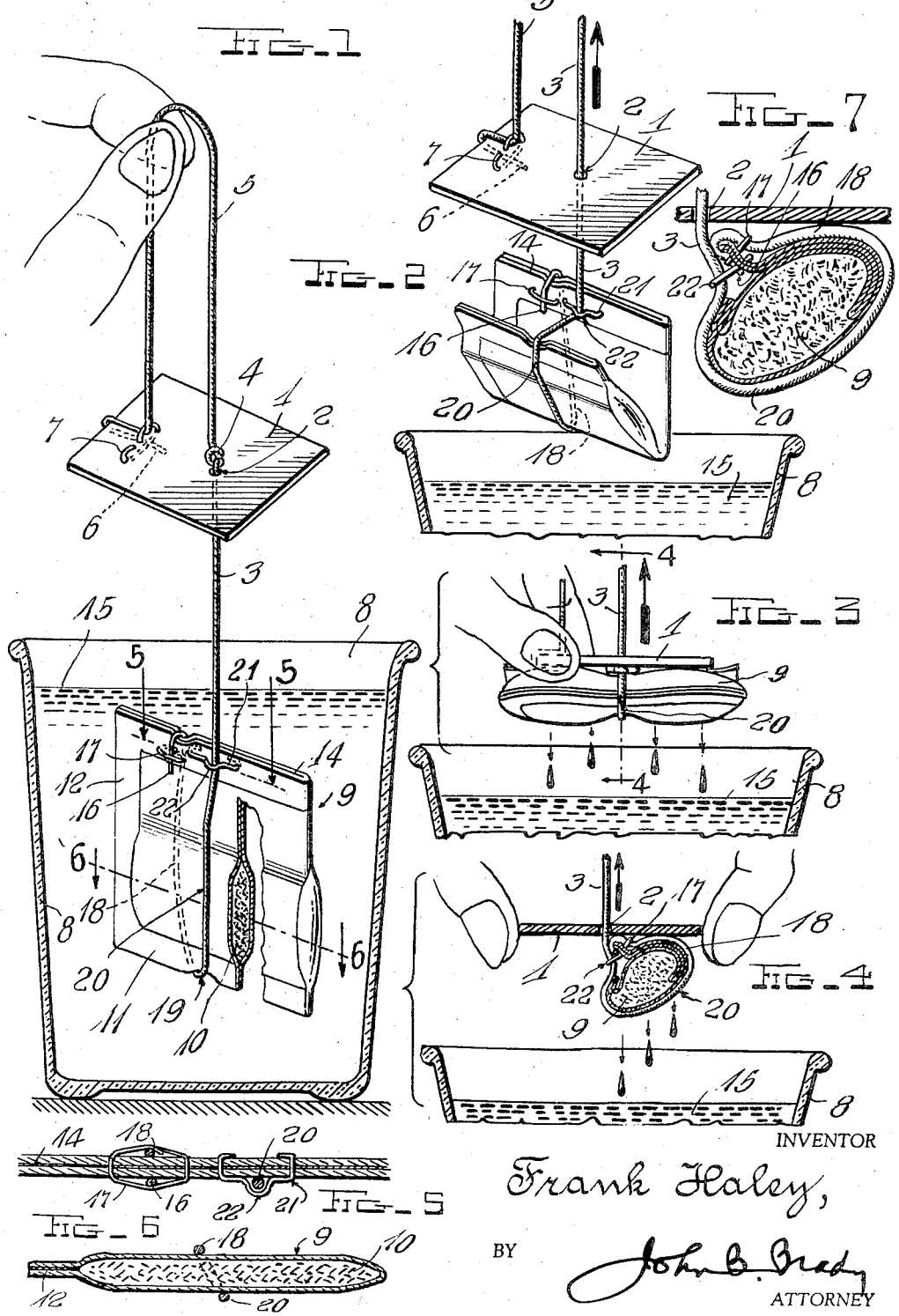

2,878,927

SELF-SQUEEZING TEA OR COFFEE BAG

Frank Haley, Winchester, Mass., assignor of one-half to Oscar W. Tippett, Wellesley Hills, Mass.

Application April 2, 1958, Serial No. 725,949

4 Claims. (Cl. 206—.5)

My invention relates broadly to tea and coffee bags and more particularly to a self-squeezing tea or coffee bag of the immersion type.

One of the objects of my invention is to provide an arrangement of cord harness for a tea or coffee bag which facilitates the immersing of a tea or coffee bag in a cup or pot and the subsequent withdrawal of the tea or coffee bag and the dehydration thereof by a squeezing operation.

Another object of my invention is to provide an arrangement of suspension cord and harness enveloping a coffee or tea bag assembled with respect to an advertising tag which serves as an abutting surface against which the tea or coffee bag may be squeezed by drawing the suspension cord taut with respect to the tag.

Still another object of my invention is to provide an arrangement of cord harness for a conventional tea or coffee bag which may be looped around the tea or coffee bag and passed through an associated tag and terminated a in draw-loop, facilitating either the suspension or the drawing of the tea or coffee bag against the lower surface of the associated tag for compressing the tea or coffee bag after its immersion for facilitating the dehydration of the bag.

A still further object of my invention is to provide an arrangement of knotted cord draw-string for a self-squeezing tea or coffee bag coacting with a supporting card against which the tea or coffee bag may be squeezed after immersion.

A still further object of my invention is to provide a cord harness for a self-squeezing tea or coffee bag which is stapled to a peripheral portion of the bag and envelops the bag and runs through the guide staple from which the cord extends through a central opening in a card which serves as an abutment surface against which the tea or coffee bag may be squeezed by drawing the cord taut through the card.

Other and further objects of my invention reside in the arrangement of looped cord harness for a self-squeezing tea or coffee bag as set forth more fully in the specification hereinafter following by reference to the accompanying drawings, in which:

Fig. 1 is a perspective view of the self-squeezing tea or coffee bag assembly of my invention showing the manner of normally suspending the tea or coffee bag through a supporting card ready for immersion in a cup or receptacle, and showing particularly the manner in which the cord harness normally encircles the tea or coffee bag;

Fig. 2 is a fragmentary perspective view showing the tea or coffee bag subsequent to immersion in the process of being drawn upwardly toward the supporting card, preparatory to the dehydrating operation;

Fig. 3 is a fragmentary view showing the manner of squeezing the tea or coffee bag against the supporting card in the dehydrating process;

Fig. 4 is a vertical sectional view taken on line 4—4 of Fig. 3 and showing the manner of compressing the tea or coffee bag against the lower surface of the supporting card, the view being partially enlarged to bring out the principle of operation of the invention;

Fig. 5 is an enlarged fragmentary horizontal sectional view taken on line 5—5 of Fig. 1;

Fig. 6 is a horizontal sectional view taken on line 6—6 of Fig. 1; and

Fig. 7 is an enlarged theoretical view of the bag in its compressed state when the force is applied for maintaining the bag in abutment with the lower surface of the supporting card 1.

My invention is directed to a cord harness assembly for self-squeezing tea or coffee bags wherein a supporting card provides a fastening means for a suspension cord which runs through a central opening in the supporting card and which is knotted to provide a loop which is maintained above the supporting card for facilitating the grasping of the cord for suspending the tea or coffee bag beneath the card. The cord continues below the card and is stapled to a peripheral portion of the tea or coffee bag and envelopes the bag and runs through a guide loop fastened to a peripheral portion of the bag. The bag may be normally immersed in a cup or pot pendently suspended from a position above the supporting card. After immersion the cord is drawn upwardly drawing the parts of the tea or coffee bag into a collapsed position against each other and ultimately compressing the bag against the lower surface of the supporting card for dehydrating the bag. The cord harness is proportioned above the supporting card to maintain the required loop against the supporting cord for raising the tea or coffee bag from an immersed position to a position in which the tea or coffee bag is depressed and dehydrated and is proportioned beneath the supporting card to provide adequate space below the supporting card for the immersion of the tea or coffee bag in a cup or receptacle and enable the tea or coffee bag to double upon itself and be drawn into a compressed position against the lower surface of the supporting card.

Referring to the drawings in more detail, reference character 1 designates a supporting card having a substantially centrally located aperture 2 therein for the passage of the suspension cord or harness 3. The suspension cord or harness 3 is knotted at 4 to divide the cord or harness into two portions, one of which constitutes a loop 5 fastened at its free end at 6 under a staple 7 extending adjacent the periphery of the supporting card 1. The knot 4 is of a size sufficiently large to restrict the loop portion from running through the supporting card. Loop 5 facilitate the grasping of the suspension cord or harness for suspending the tea or coffee bag assembly in a cup or receptacle 8.

The tea or coffee bag is shown at 9 having a quantity of tea or coffee 10 sealed therein with the marginal edges of the bag compressed as represented at 11, 12 and 14. The tea or coffee bag 9 is formed from material through which water 15 in the cup or receptacle 8 infiltrates into the tea or coffee 10 and with respect to which the terminating end 16 of the cord or harness 3 is stapled by means of fastening staple 17 disposed in marginal portion 14 of the tea or coffee bag. The end 16 of the cord or harness is looped over the marginal edge 14 of the tea or coffee bag to the position 18 where it is clamped under the opposite side of the staple 17. The cord or harness 3 then continues around the bag 9 passing under the lower marginal edge 11 thereof as represented at 19 where it envelops the coffee or tea bag 9 and extends upwardly along the side thereof as represented at 20 in a position diagonally displaced from the position of the cord or harness 18 on the opposite side of the bag. The portion of the cord 20 extends slidably through the staple 21 which is fastened through the marginal edge 14 of the bag in a position displaced from the staple 17. The staple 21 is preformed to provide a central eye 22 therein through which the cord 20 is free to slide as the upper portions 3, 4 and 5 thereof are drawn upwardly.

After immersion of the tea or coffee bag in the water 15 in the cup or receptacle 8, as shown in Fig. 1, for a sufficient time for making the tea or coffee, the bag is drawn upwardly as represented in Fig. 2 by pulling upwardly on the loop 5 which doubles the tea or coffee bag 9 upon itself as the parts 18 and 20 of the cord or harness are pulled taut as represented in Fig. 2.

Fig. 3 shows the position when the enveloping cord or harness compresses the folded parts of the bag 9 against the under-surface of the supporting card 1. Fig. 4 which is a vertical sectional view, substantially on line 4—4 of Fig. 3, shows the manner in which the cord or harness compresses the contents of the tea or coffee bag against the under-surface of the supporting card 1 for dehydrating the bag and releasing the drippings therefrom into the cup or receptacle 8.

Fig. 7 more clearly shows the manner in which the rolled bag is compressed against the under-surface of the supporting card.

The supporting card 1 is of a size slightly larger than the periphery of the rolled-up bag when it is compressed so that the fingers gripping the edges of the card never contact the bag. As more clearly shown in Figs. 4 and 7 the compression action on the bag is substantially a rolling movement for the bag wherein the bag occupies approximately one-half of the area of the card with the cord or harness 3 pulled taut in a vertical direction which is substantially tangent to the compressed surface of the bag. In order to insure the free running of the cord through the eye 22 of the staple 21, the diameter of the eye 22 is slightly larger than the transverse section of the cord or harness 3 so that the bag 9 may be readily rolled-up and maintained in position abutting the under surface of the supporting card 1 by application of the drawing force on the cord or harness 3.

By reason of the compressive action the tea or coffee may be made stronger; there is less bulk to the compressed tea or coffee bag when it is being thrown away; the contents of the tea or coffee bag are thoroughly protected enabling the tea or coffee bag to be reused if desired; the fact that the supporting card provides an abutment for the compressed tea or coffee bag insures delicacy and neatness in the use of the tea or coffee bag; the fact that compression is effected by a vertically upward force against the supporting card eliminates the tipping of the cup or receptacle by side-pressing which is a customary practice; the pressing of the bag with a spoon which often results in squirts of the tea or coffee is eliminated; the assembly is suitable to all stock independently of the quality of the bag; and the assembly may be produced by using the same machines as are currently available in forming conventional tea or coffee immersion bags.

Although I have illustrated the tea or coffee bag in its simplest form as a conventional infiltration bag my invention is equally applicable to flow-through bags and bags of other contours, shapes, and sizes and I desire that the disclosure herein be considered in the illustrative sense and not in the limiting sense.

While I have described my invention in certain of its preferred embodiments I realize that modifications may be made, and I wish it to be understood that no limitations upon my invention are intended other than those which may be imposed by the scope of the appended claims.

What I claim as new and desire to secure by Letters Patent of the United States, is as follows:

1. An infiltration bag assembly, comprising a supporting card having an aperture located substantially centrally therein, a suspension cord fastened to a peripheral portion of the card and formed into a suspension loop and knotted in a position above the aperture in the supporting card for restricting the movement of the cord downwardly through the card, an infiltration bag having sealed marginal portions confining the contents therein, said cord extending downwardly through the aperture in said card and looped around and enveloping said infiltration bag and fastened at its end on the upper marginal edge of said bag, guide means fastened in the marginal edge of said bag adjacent the location in which the end of said cord is fastened, said cord extending through said guide means whereby an upward force exerted on the loop of said cord draws the portion of said cord which is looped around and envelops said infiltration bag taut for compressing said bag and moves said bag into abutting relation with the under-surface of said supporting card for compressing the contents of said bag against the said under-surface of said supporting card.

2. An infiltration bag assembly as set forth in claim 1 in which said guide means is a staple having an eye formed therein substantially conforming with the cross sectional contour of said cord and enabling said cord to be drawn upwardly through the aperture in said card while running freely through the eye in said staple.

3. An infiltration bag assembly as set forth in claim 1 in which said guide means is a staple having an eye formed therein on the side opposite the side of said bag to which the end of said cord is fastened, said eye being larger than the transverse section of said cord, whereby said cord is freely movable therethrough, and wherein said staple is substantially lineally aligned with the location at which said cord is fastened to said bag.

4. An infiltration bag assembly as set forth in claim 1 in which the portion of the cord that is looped around and envelops said bag rolls said bag into an area of approximately one-half the total area of the supporting card with the cord extending upwardly through the aperture in the supporting card in a direction substantially tangent to the compressed surface of the bag.

References Cited in the file of this patent

UNITED STATES PATENTS

| | | |
|---|---|---|
| 2,285,113 | Eaton | June 2, 1942 |
| 2,800,408 | Fimple | July 23, 1957 |